United States Patent
Watabe et al.

(10) Patent No.: US 12,503,066 B2
(45) Date of Patent: Dec. 23, 2025

(54) FRONT STRUCTURE OF VEHICLE

(71) Applicant: MAZDA MOTOR CORPORATION, Hiroshima (JP)

(72) Inventors: Yuki Watabe, Hiroshima (JP); Yasushi Ishikawa, Hiroshima (JP); Ryosuke Ueta, Hiroshima (JP); Shinji Yamauchi, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 548 days.

(21) Appl. No.: 18/169,198

(22) Filed: Feb. 14, 2023

(65) Prior Publication Data

US 2024/0092424 A1    Mar. 21, 2024

(30) Foreign Application Priority Data

Sep. 20, 2022   (JP) ................. 2022-149605

(51) Int. Cl.
*B60R 16/02*   (2006.01)
*B62D 21/15*   (2006.01)
*B62D 25/08*   (2006.01)

(52) U.S. Cl.
CPC ...... *B60R 16/0215* (2013.01); *B60R 16/0207* (2013.01); *B62D 21/152* (2013.01); *B62D 25/085* (2013.01)

(58) Field of Classification Search
CPC . B60K 5/04; B60K 2001/0411; B60L 3/0007; B60R 16/0215; B62D 25/082; B62D 25/085

USPC ............ 296/187.03, 187.09, 193.09
See application file for complete search history.

(56) References Cited

U.S. PATENT DOCUMENTS

| | | | | |
|---|---|---|---|---|
| 11,148,532 B2 * | 10/2021 | Peirone | ............... | B60L 3/0007 |
| 11,569,539 B1 * | 1/2023 | Stoddart | ............... | B60K 1/00 |
| 2018/0290689 A1 * | 10/2018 | Yoshii | ............... | B60L 3/0007 |
| 2023/0264754 A1 * | 8/2023 | Yoshida | ............... | B62D 25/081 |
| | | | | 180/65.1 |

FOREIGN PATENT DOCUMENTS

JP    2020-082789 A    6/2020

* cited by examiner

*Primary Examiner* — Jason S Daniels
(74) *Attorney, Agent, or Firm* — Studebaker Brackett PLLC

(57) ABSTRACT

An electromotive compressor fixed to a front side of an engine includes a live part. A harness connection portion where a hinge-voltage harness is connected is provided in an outer peripheral area of a left side, in a vehicle width direction, of the electromotive compressor. A protecting member comprises a first cover portion which covers an area corresponding to the live part from the front side and a second cover portion which is provided continuously to the first cover portion and covers the harness connection portion from the front side with a specified distance from the harness connection portion. A low rigidity portion which has lower rigidity than the first covet portion and the second cover portion is provided at a continuous portion of the first cover portion and the second cover portion.

12 Claims, 11 Drawing Sheets

FRONT STRUCTURE OF VEHICLE

BACKGROUND OF THE INVENTION

The present invention relates to a front structure of a vehicle which comprises a high-voltage component, such as an electromotive compressor.

Conventionally, in an electromotive vehicle with a drive source of an electromotive motor or a hybrid vehicle with a combined drive source of an engine and the electromotive motor, an electromotive type of compressor which compresses coolant gas of an air conditioner without relying on an engine drive has been used. For example, in a vehicle disclosed in Japanese Patent Laid-Open Publication No. 2020-82789, an electromotive compressor is provided at a frame portion which is positioned on a driver's seat side in a vehicle front area.

The above-described electromotive compressor has a live part where a high-voltage current flows inside its case (housing), and a high-voltage harness to connect the live part and a power control unit or the like is connected to a case (housing) outer-peripheral portion. In order to protect these live part and harness connection portion, it can be considered that the electromotive compressor is fixed to a rear side of an engine as shown in the above-described patent document, whereby a front side of the electromotive compressor can be protected with the engine.

Herein, in a case where the electromotive compressor is provided on the front side of the engine from a component-layout requirement or the like, for example, it becomes necessary that the electromotive compressor is protected from an impact load applied from a vehicle front side by covering the front side of the electromotive vehicle with a protecting member.

However, if a structure in which the electromotive compressor is simply covered with the protecting member in a wide range is applied, there is a concern that when the high-voltage harness is connected to the case (housing) of the electromotive compressor in vehicle assembling or the high-voltage harness is removed from the case (housing) of the electromotive compressor in vehicle maintenance, the protecting member becomes an obstacle so improperly that the work efficiency (workability) may be deteriorated.

Likewise, this may also happen to a case where another high-voltage component, such as an electromotive water pump, is provided in the vehicle front area.

SUMMARY OF THE INVENTION

The present invention has been devised in view of the above-described matter, and an object of the present invention is to provide a front structure of a vehicle which can properly improve the workability of the high-voltage harness to be attached to or removed from the high-voltage component provided in the vehicle front area and also securely protect the live part of the high-voltage component and the harness connection portion.

A first aspect of the present invention is a front structure of a vehicle, comprising a high-voltage component including a live part to be energized when being operated, the high-voltage component being fixed to a front side of a fixed portion provided in a vehicle front area, and a protecting member to protect the high-voltage component, wherein a harness connection portion where a hinge-voltage harness is connected is provided in an outer peripheral area of at least one of both sides, in a vehicle width direction, an upper side, and a lower side of the high-voltage component, and the protecting member comprises a first cover portion which covers an area corresponding to the live part from the front side, a second cover portion which is provided continuously to the first cover portion and covers the harness connection portion from the front side with a specified distance from the harness connection portion, and a low rigidity portion which is provided at a continuous portion of the first cover portion and the second cover portion and has lower rigidity than the first covet portion and the second cover portion.

A second aspect of the present invention is a front structure of a vehicle, comprising a high-voltage component including a live part to be energized when being operated, the high-voltage component being fixed to a front side of a fixed portion provided in a vehicle front area, and a protecting member to protect the high-voltage component, wherein a harness connection portion where a hinge-voltage harness is connected is provided in an outer peripheral area of at least one of both sides, in a vehicle width direction, an upper side, and a lower side of the high-voltage component, and the protecting member comprises a first cover portion which covers an area corresponding to the live part from the front side, a second cover portion which is provided continuously to the first cover portion and covers the harness connection portion from the front side with a specified distance from the harness connection portion, and a low rigidity portion which is provided at a continuous portion of the first cover portion and the second cover portion and configured to become a causing point to bend the second cover portion rearwardly relative to the first cover portion such that the second cover portion moves to a position to cover the harness connection portion in a case where an impact load is applied to the second cover portion from a vehicle front side.

According to the first or second aspects of the present invention, since a specified space is formed between the second cover portion and the harness connection portion, a worker can easily conduct (perform) attaching or removing of the high-voltage harness for the high-voltage component in the assembling or maintenance work. Meanwhile, in a case where the protecting member receives the impact load from the vehicle front side, since the high-voltage component fixed to the fixed portion prevents the first cover portion from moving rearwardly, the first cover portion is maintained at a state where the first cover portion covers the area corresponding to the live part of the high-voltage component from the front side. On the other hand, since a specified space is provided on the rear side of the second cover portion, the second cover portion moves rearwardly, being bent with the causing point at the low rigidity portion relative to the first cover portion, to the position where the second cover portion covers the area corresponding to the harness connection portion of the high-voltage component. Thus, since the protecting member comes to cover the live part and the harness connection portion of the high-voltage component in a close state, a state where the live part and the harness connection portion are exposed is so prevented that the live part and the harness connection portion can be protected securely.

In an embodiment of the present invention, the low rigidity portion is constituted by one or more cutting (notch) recess portions or hole portions and one or more continuous portions connecting the first cover portion and the second cover portion.

According to this embodiment, since the low rigidity portion is formable by relatively easy processing (manufacturing), processing (manufacturing) costs can be reduced.

In another embodiment of the present invention, the harness connection portion is provided in the outer peripheral area of either one of the both sides, in the vehicle width direction, of the high-voltage component, the protecting member has a ridgeline portion extending in the vehicle width direction, and at least one of the cutting recess portion and the hole portion is formed at a position to straddle the ridgeline portion.

According to this embodiment, in a case where the second cover portion is bent rearwardly relative to the first cover portion, the impact load can be efficiently transmitted from the ridgeline portion to the low rigidity portion, so that bending deformation caused by the low rigidity portion can be generated stably. Accordingly, in a case where the impact load is applied to the protecting member from the vehicle front side, it can be prevented that the second cover portion is deformed in an unintended direction relative to the first cover portion, so that the harness connection portion can be securely covered with the second cover portion.

In another embodiment of the present invention, the harness connection portion is provided in the outer peripheral area of either one of the both sides, in the vehicle width direction, of the high-voltage component, and the protecting member comprises a third cover portion which extends rearwardly from an upper portion of the first cover portion and covers the area corresponding to the live part from the upper side and a fourth cover portion which extends rearwardly from a lower portion of the first cover portion and covers the area corresponding to the live part from the lower side.

According to this embodiment, an upper side of the area corresponding to the live part of the high-voltage component can be protected with the third cover portion, and a lower side of the area corresponding to the live part of the high-voltage component can be protected with the fourth cover portion. Accordingly, the high-voltage portion can be securely protected even if the impact load is applied to the high-voltage component from a vehicle upper side or a vehicle lower side.

In another embodiment of the present invention, the third cover portion and the fourth cover portion are configured to be separate from the first cover portion.

According to this embodiment, the protecting member which has a complex shape such that it covers the area corresponding to the live part of the high-voltage component from three sides of the front side, the upper side, and the lower side can be relatively easily manufactured. Thus, the processing (manufacturing) steps are so reduced that the processing costs can be reduced.

In another embodiment of the present invention, at least one of the third cover portion and the fourth cover portion is provided with an overhang portion which overhangs toward the upper side or the lower side and extends in a vehicle longitudinal direction.

According to this embodiment, the section modulus of a cross section of the third cover portion or the fourth cover portion which crosses the vehicle longitudinal direction becomes large because of the overhang portion extending in the vehicle longitudinal direction. Thereby, deformation, in a vehicle vertical direction, of the third cover portion or the fourth cover portion relative to the first cover portion becomes so difficult that generation of noises, which may be caused by vertical vibrations of the third cover portion or the fourth cover portion, or deterioration of the durability performance can be prevented.

The present invention will become apparent from the following description which refers to the accompanying drawings.

DETAILED DESCRIPTION OF THE INVENTION

Hereafter, an embodiment of the present invention will be described specifically referring to the drawings. The following description of the preferable embodiment is merely one example of the present invention.

Figure 1:
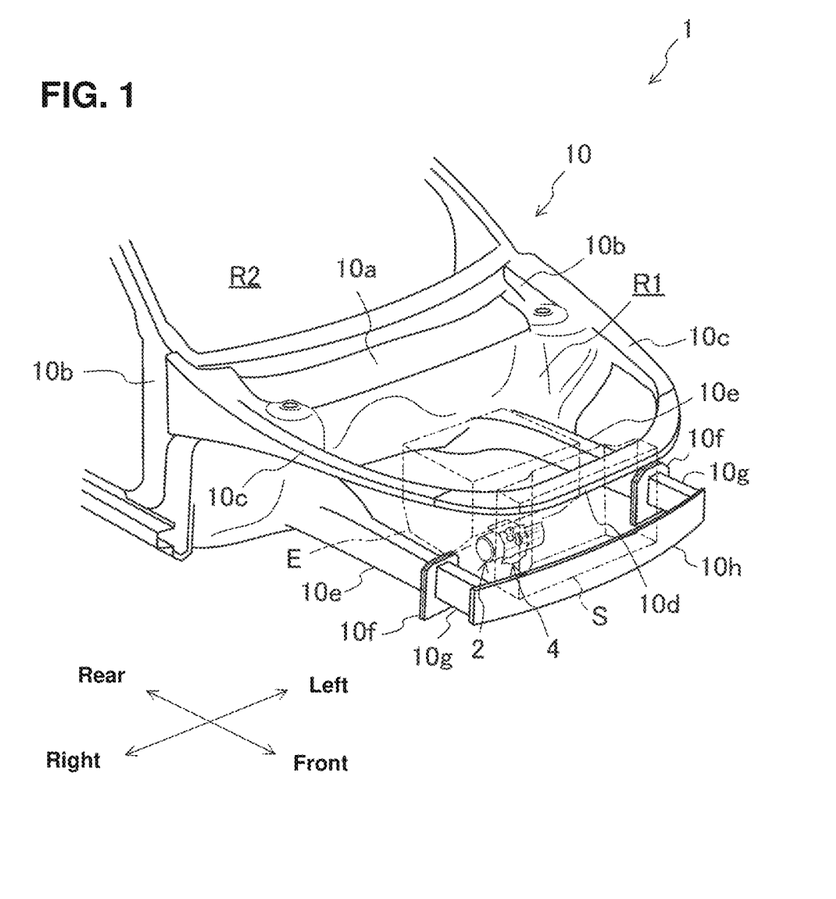
FIG. 1 is a schematic perspective view of a front structure of a vehicle according to an embodiment of the present invention.

FIG. 1 shows a front structure 10 of a vehicle 1 of the present embodiment. The vehicle 1 is a hybrid vehicle driven by a so-called hybrid system, which has an engine room R1 (vehicle front area) where an engine E (fixed portion) to constitute the hybrid system is provided at around a center of the front structure 10. Herein, in the description of the embodiment, a vehicle front side is simply referred to as a "front side," a vehicle rear side is simply referred to as a "rear side," a vehicle right side is simply referred to as "right side," and a vehicle left side is simply referred to as a "left side."

A dash panel 10a to partition the engine room R1 from a cabin R2 is provided at a rear portion of the engine room R1, and a pair of front hinge pillars 10b to rotatably support right-and-left front doors (not illustrated) are provided at right-and-left both sides of the dash panel 10a.

A pair of right-and-left apron members 10c which respectively extend forwardly from the right-and-left front hinge pillars 10b, gently curving, are provided at an upper portion of the engine room R1 with a specified distance therebetween in a vehicle width direction. A shroud upper member 10d which interconnects respective front ends of the apron members 10c and has a roughly U shape in a plan view is provided at a front side of the upper portion of the engine room R1.

Meanwhile, at a midway portion, in a vertical direction, of the engine room R1 are provided a pair of right-and-left front side frames 10e with a specified distance therebetween in the vehicle width direction, which respectively have a rectangular-shaped cross section longitudinally extending substantially linearly. Further, a rectangular tube-shaped crash can 10g which has a tube-center line extending in a longitudinal direction is connected to each of the above-described front side frames 10e via a flange portion 10f.

Further, a bumper reinforcement 10h which extends in the vehicle width direction in a gentle-curve shape such that its central portion is positioned on the front side of its both sides and is provided at a front side of the midway portion, in the vertical direction, of the engine room R1, and respective front ends of the above-descried crash cans 108 are connected to a rear face of the bumper reinforcement 10h at right-and-left both-side positions.

A resin-made shroud S which has a roughly rectangular-plate shape is provided between the bumper reinforcement 10h and the engine E. The shroud S has a specified thick in the vehicle longitudinal direction and its upper edge portion is connected to the shroud upper member 10d.

Figure 2:
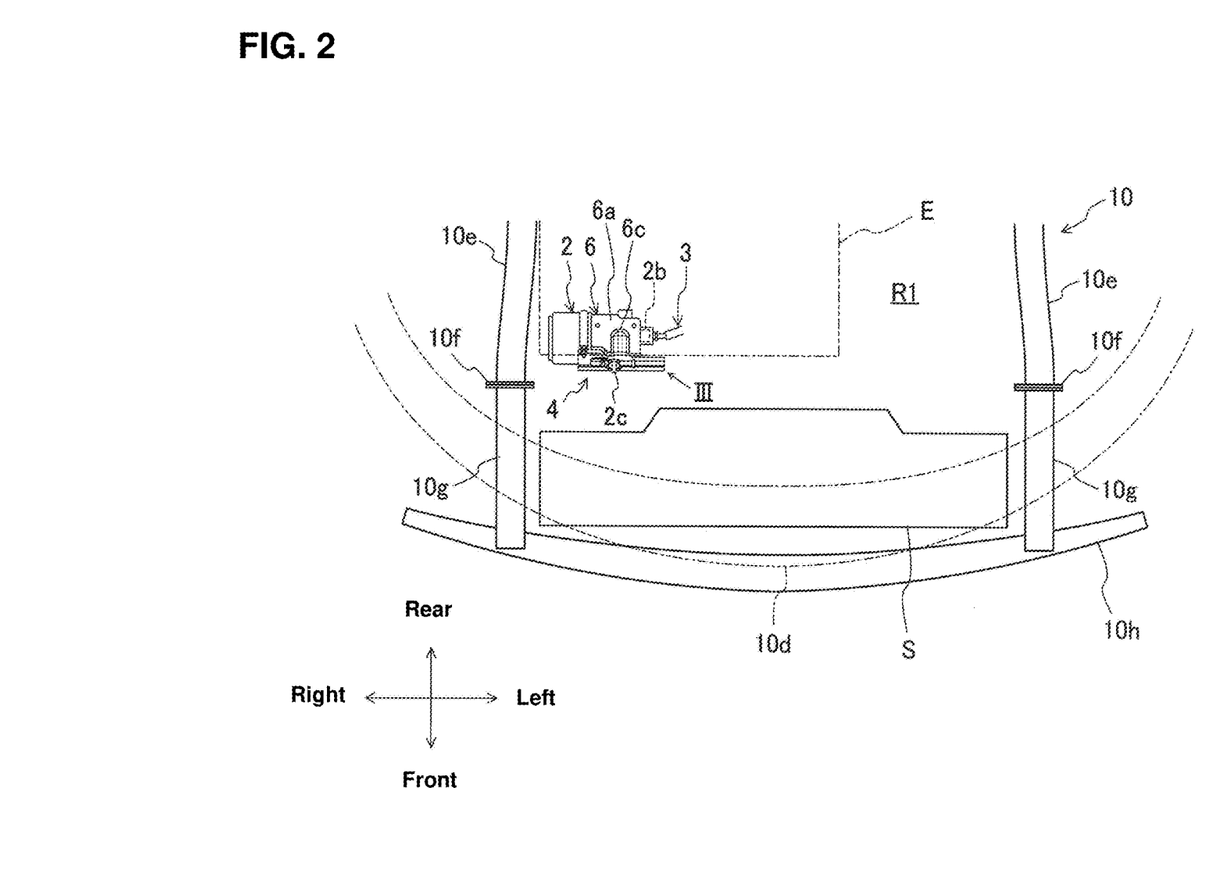
FIG. 2 is a schematic plan view of the front structure of the vehicle according to the embodiment of the present invention.
Figure 3:
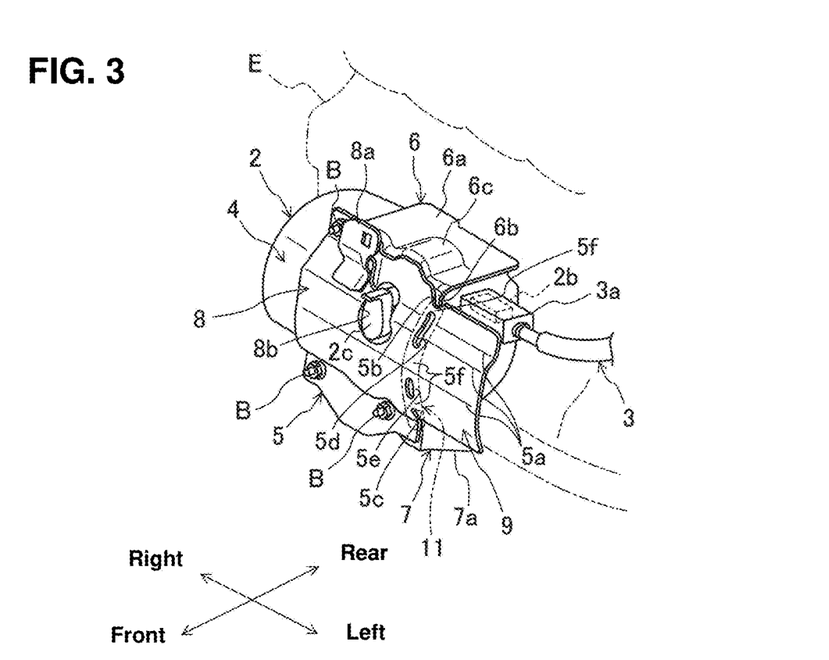
FIG. 3 is a perspective view showing an electromotive compressor, when viewed from a direction III in FIG. 2.

As shown in FIGS. 2 and 3, an electromotive compressor 2 (high-voltage component) to compress coolant gas of an air conditioner is provided at a position near a right-side end portion of a front-side lower portion of the engine E.

As shown in FIGS. 3-7, the electromotive compressor 2 has a roughly tube shape with a center line extending in the vehicle width direction, and in an area extending from a central portion to a left-side end portion inside the electromotive compressor 2 is provided a live part 2a which comprises a motor, an inverter device, and others to be energized when being operated.

A harness connection portion 2b which protrudes is provided at an upper portion of an outer peripheral area of the left side of the electromotive compressor 2, and a connector portion 3a of a high-voltage harness 3 which is coupled to a power control unit, not illustrated, is connected to the harness connection portion 2b.

In the present specification, a high voltage means a direct-current (DC) voltage exceeding 60 volts or an alternating-current (AC) voltage exceeding 30 volts (effective value), and the high-voltage component widely means any electric component to be operated by this high voltage.

A protecting member 4 to protect the electromotive compressor 2 is provided at the front side of the electromotive compressor 2.

The protecting member 4 is formed in a roughly U shape such that it is opened rearwardly when viewed in the vehicle width direction, which comprises a front-side protecting panel 5 which is positioned on the front side of the electromotive compressor 2, and an upper-side protecting panel 6 and a lower-side protecting panel 7 which are separate from the front-side protecting panel 6 and positioned on the upper side and on the lower side of the electromotive compressor 2, respectively.

The front-side protecting panel 5 is made by pressing a steel plate and configured such that its upper-and-lower central areas protrude forwardly in an arch (bow) shape when viewed in the vehicle width direction as shown in FIG. 3. The front-side protecting panel 5 has three ridgeline portions 5a which are formed through bending pressing. These ridgeline portions 5a are provided to extend in the vehicle width direction with a specified distance, in a vertical direction, therebetween, whereby a surface rigidity of the panel 5 is increased.

A specified area of the front-side protection panel 5 which extends from a center, in the vehicle width direction, thereof to a right-side end thereof constitutes a first cover portion 8 of the present invention, whereas a left-side area of the front-side protection panel 5 which is continuous to the first cover portion 8 constitutes a second cover portion 9 of the present invention.

Figure 4:
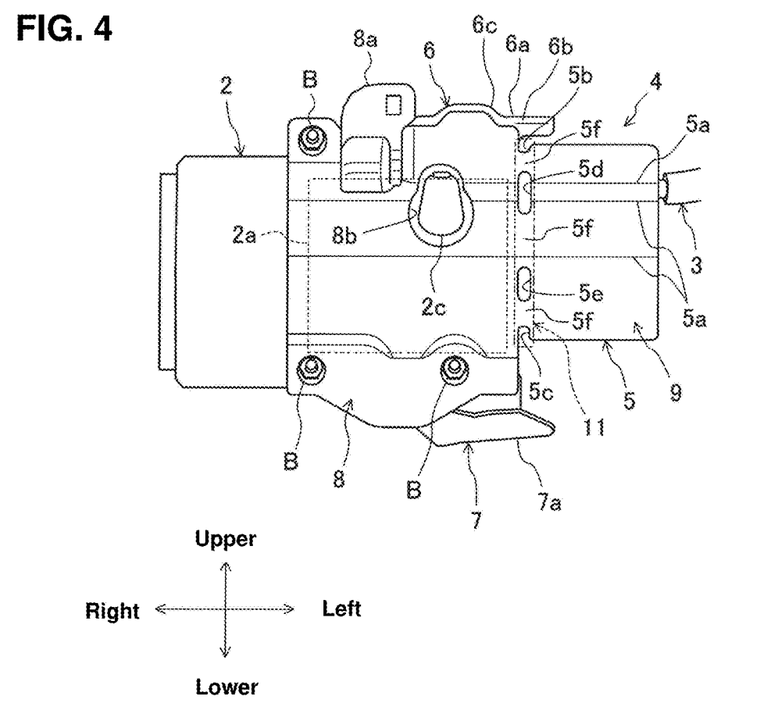
FIG. 4 is a front view of the electromotive compressor and a protecting member to protect the electromotive compressor which are provided at the front structure of the vehicle, when viewed from a front side of the vehicle.
Figure 5:
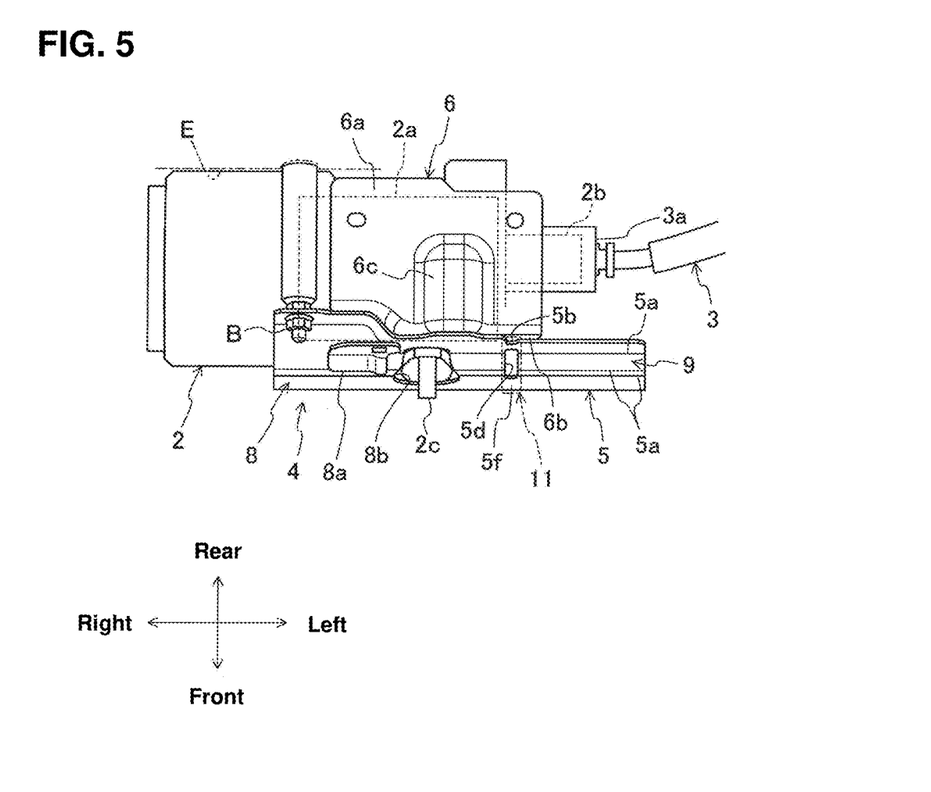
FIG. 5 is an upper view of the electromotive compressor and the protecting member to protect the electromotive compressor which are provided at the front structure of the vehicle, when viewed from an upper side of the vehicle.
Figure 6:
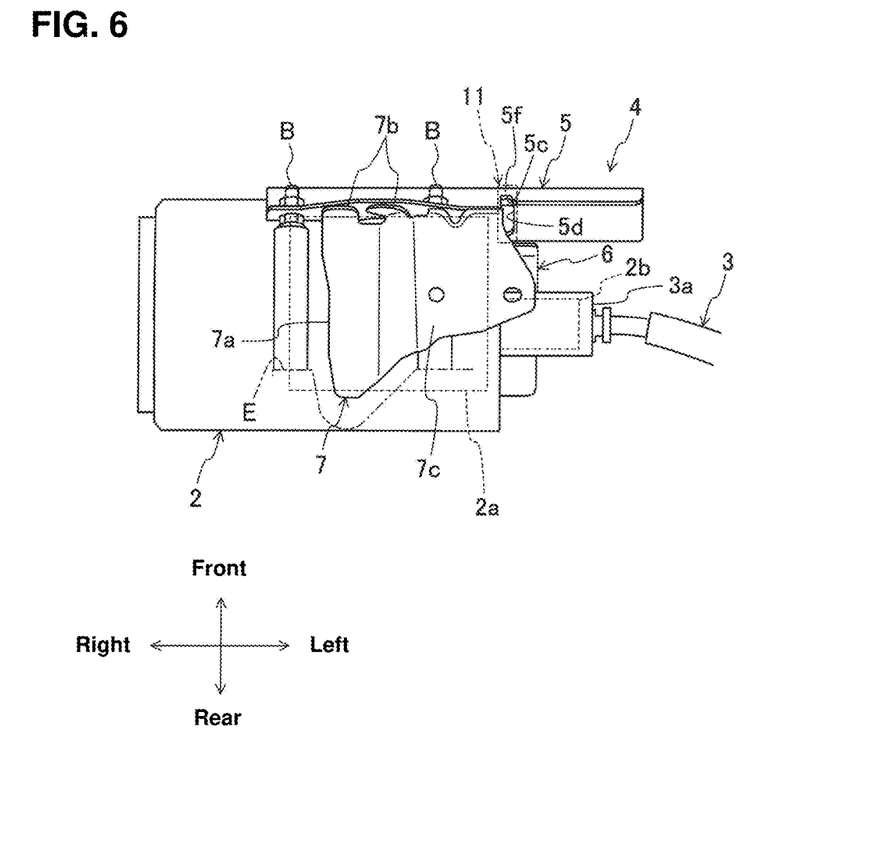
FIG. 6 is a lower view of the electromotive compressor and the protecting member to protect the electromotive compressor which are provided at the front structure of the vehicle, when viewed from a lower side of the vehicle.

As shown in FIGS. 4-6, the first cover portion 8 covers an area of the electromotive compressor 2 which corresponds to the live part 2a from the front side.

An upper-side area of the first cover portion 8 is configured to protrude upwardly beyond the second cover portion 9, and fixed to both of the electromotive compressor 2 and the engine E by a single fastening member B at its right-side point.

Meanwhile, a lower-side area of the first cover portion 8 is configured to protrude downwardly beyond the second cover portion 9, and fixed to both of the electromotive compressor 2 and the engine E by two fastening members B at its right-side point and its left-side point which are separate from each other in the vehicle width direction.

As shown in FIG. 3, a support plate 8a which is made of a steel material and extends vertically in a roughly wave shape, when viewed in the vehicle width direction, is attached to a right-side upper position of a front face of the first cover portion 8. This support plate 8a is configured to support a radiator hose, not illustrated.

Further, as shown in FIG. 4, an interference-avoidance hole 8b which is configured such that a dimension, in the vehicle width direction, of its upper-side area is smaller than that of its lower-side area is formed at a left-side upper position of the first cover portion 8. A drain cock 2c of the electromotive compressor 2 is exposed forwardly through this interference-avoidance hole 8b.

The second cover portion 9 is positioned forwardly with a specified distance from the harness connection portion 2b and covers this portion 2b from the front side as shown in FIG. 5.

A first cutting (notch) recess portion 5b (cutting recess portion) which is opened upwardly is formed at an upper end of a continuous portion of the first cover portion 8 and the second cover portion 9, whereas at a lower end of the continuous portion of the first cover portion 8 and the second cover portion 9 is formed a second cutting (notch) recess portion 5c (cutting recess portion) which is opened downwardly.

A first long hole 5d (hole portion) and a second long hole 5e (hole portion) which are respectively configured to penetrate longitudinally and extend vertically are formed at an area of the continuous portion of the first cover portion 8 and the second portion 9 which is positioned between the first cutting recess portion 5b and the second cutting recess portion 5c. These long holes 5d, 5e are arranged in a row in the vertical direction, and the first long hole 5d is provided to straddle the two ridgeline portions 5a which are located at a higher level.

By providing the first cutting recess portion 5b, the second cutting recess portion 5c, the first long hole 5d, and the second long hole 5e at the continuous portion of the first cover portion 8 and the second cover portion 9, three continuous portions 5f which connect the first cover portion 8 and the second cover portion 9, respectively, are formed between the first cutting recess portion 5b and the first long hole 5d, between the first long hole 5d and the second long hole 5e, and between the second cutting recess portion 5c and the second long hole 5e.

The first cutting recess portion 5b, the second cutting recess portion 5c, the first long hole 5d, the second long hole 5e, and the continuous portions 5f constitute a low rigidity portion 11 of the present invention. This low rigidity portion 11 is provided at substantially the same position as a left-side end portion of the electromotive compressor 2 in the vehicle width direction, and has the lower rigidity than the first cover portion 8 and the second cover portion 9. Thereby, as shown in FIGS. 8-11, in a case where an impact load L1 is applied to the second cover portion 9 from the front side, the second cover portion 9 moves rearwardly, being bent with a causing point at the low rigidity portion 11 relative to the first cover portion 8, to a position where the second cover portion 9 covers the harness connection portion 2b.

Figure 7:
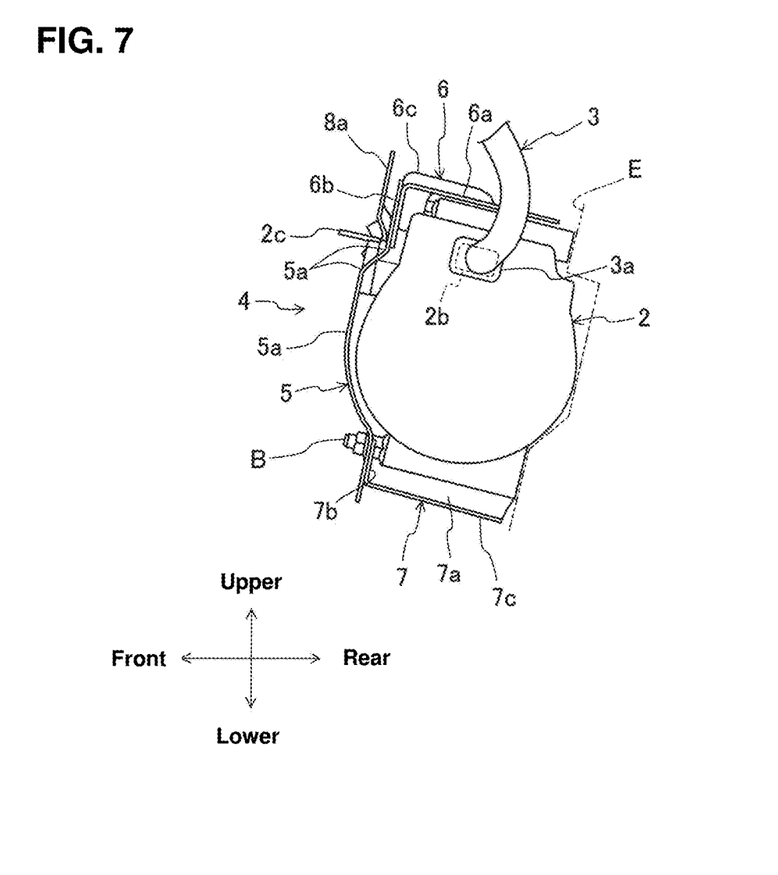
FIG. 7 is a left side view of the electromotive compressor and the protecting member to protect the electromotive compressor which are provided at the front structure of the vehicle, when viewed from a left side in a vehicle width direction.

As shown in FIGS. 5 and 7, the upper-side protecting panel 6 is made by pressing a steel plate such that it has a L-shaped cross section, which comprises a third cover portion 6a which is formed in a roughly rectangular shape in the plan view and a flange portion 6b which extends downwardly from a front-side edge portion of the third cover portion 6a.

The upper-side protecting panel 6 is assembled to the front-side protecting panel 5 by spot-welding the flange portion 6b to an upper portion of the first cover portion 8, and the third cover portion 6a extends rearwardly from the upper portion of the first cover portion 8 and covers an area which corresponds to the live part 2a from the upper side.

Further, a first overhang portion 6c which overhangs upwardly in a roughly semicircular shape, when viewed in the vehicle longitudinal direction, and extends in the vehicle longitudinal direction is formed at a front side of the third cover portion 6a which is positioned closely to its left end.

As shown in FIGS. 6 and 7, the lower-side protecting panel 7 is made by pressing a steel plate, which comprises a fourth cover portion 7a which is formed in a roughly trapezoidal shape in the plan view and a pair of extension portions 7b which extends downwardly from two points of a front-side edge portion of the fourth cover portion 7a.

The lower-side protecting panel 7 is assembled to the front-side protecting panel 5 by spot-welding the pair of extension portions 7b to a lower portion of the first cover portion 8, and the fourth cover portion 7a extends rearwardly from the lower portion of the first cover portion 8 and covers an area which corresponds to the live part 2a from the lower side.

Further, a left-side area of the fourth cover portion 7a overhangs downwardly in a step shape compared to its right-side area and constitutes a second overhang portion 7c of the present invention.

Next, moves of the electromotive compressor 2 and its surrounding structure of the front structure 10 in a case where the traveling vehicle 1 hits against an obstacle A which is positioned on its front-right side will be described specifically. Herein, only the moves of the main part of the front structure 10 to which the impact load L is applied will be described for convenience in FIGS. 8-11.

Figure 8:
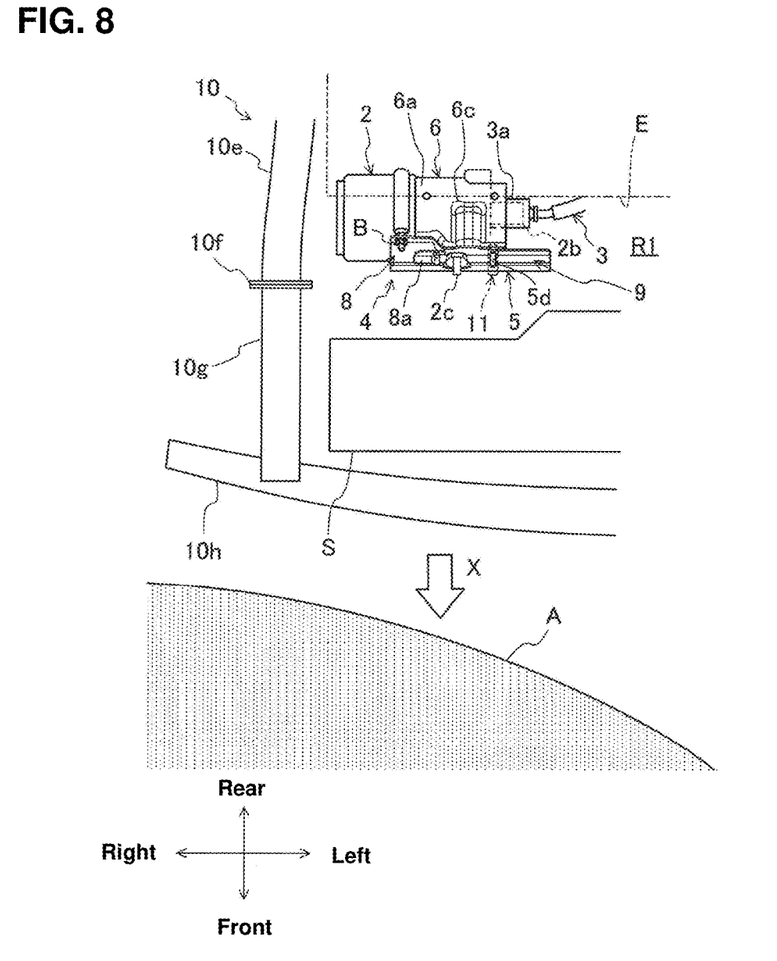
FIG. 8 is a schematic plan view of the front structure of a right side of the vehicle in a state just before an impact load is applied from a vehicle front side.
Figure 9:
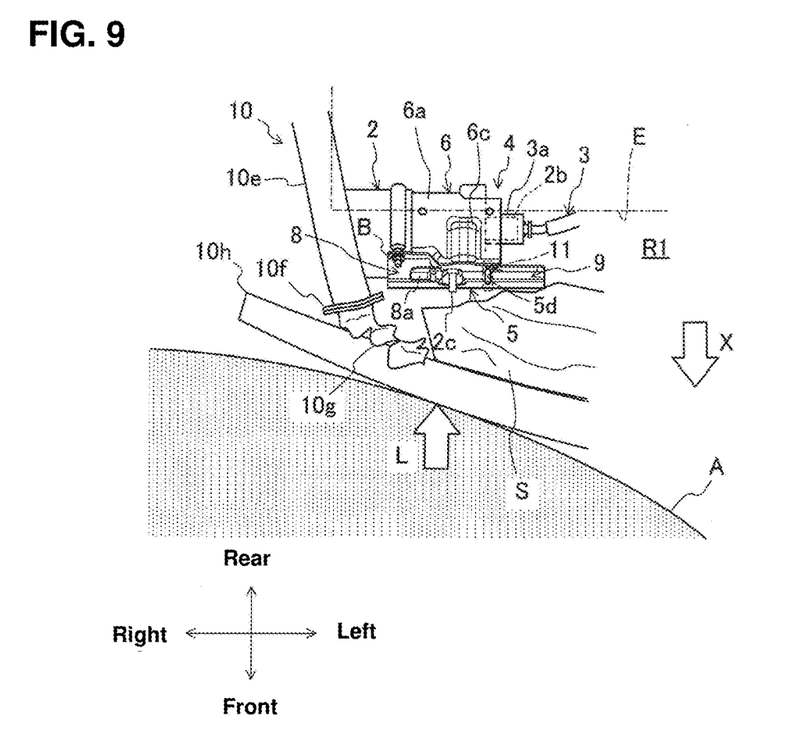
FIG. 9 is a schematic plan view of the front structure of the right side of the vehicle in a state just after a frame structure and a shroud start to move rearwardly, being deformed, because of application of the impact load, which happens after the state shown in FIG. 8.

As shown in FIGS. 8 and 9, when the vehicle 1 traveling in a direction X hits against the obstacle A from the front side, the impact load L is applied to a right-side area of the bumper reinforcement 10h from the front side first. Then, the bumper reinforcement 10h moves toward the rear side as well as the left side, being deformed. As the bumper reinforcement 10h starts to move, the right-side crash can 10g is crushed in the longitudinal direction, and according to this move, the front-side area of the right-side front side frame 10e starts to move toward the left side, being deformed, as well. Accordingly, a space behind the bumper reinforcement 10h is narrowed, so that the shroud S and its surrounding components start to move rearwardly, being pressed and crushed.

Figure 10:
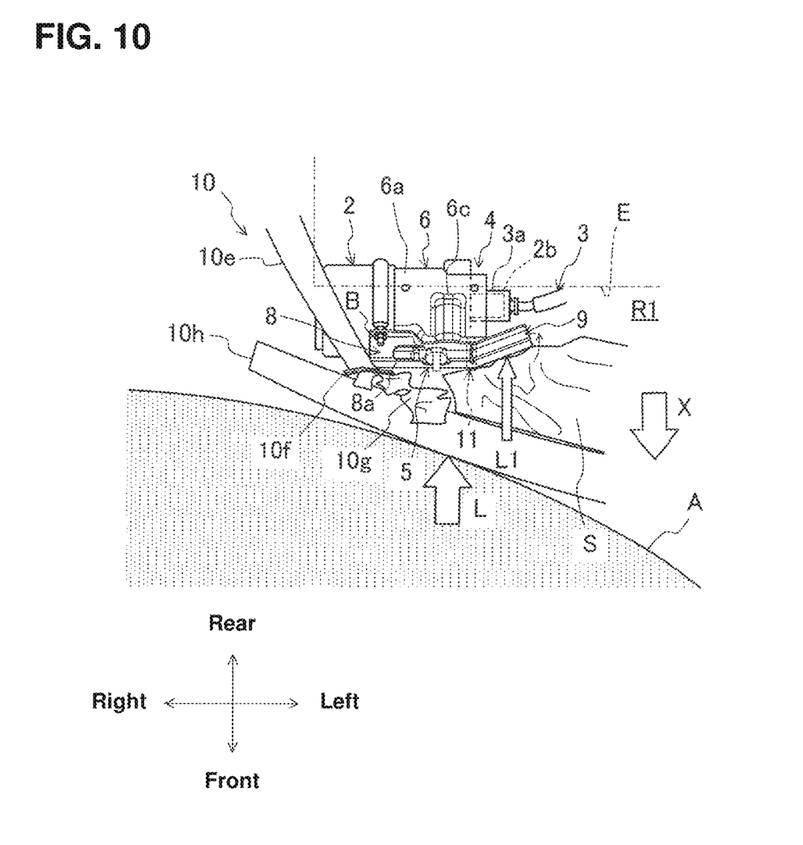
FIG. 10 is a schematic plan view of the front structure of the right side of the vehicle in a midway state of the frame structure and the shroud moving rearwardly, being deformed, because of the application of the impact load, which happens after the state shown in FIG. 9.

Since the right-side area of the rearwardly-moving shroud S is positioned on the front side of the electromotive compressor 2, as shown in FIG. 10, the shroud S hits against the protecting member 4 from the front side, so that the impact load L is applied to the protecting member 4 from the front side. When the protecting member 4 receives the impact load L1, since the electromotive compressor 2 which is fixed to the engine E prevents the first cover portion 8 of the protecting member 4 from moving rearwardly, the first cover portion 8 is maintained at a state where the first cover portion 8 covers the area corresponding to the live part 2a of the electromotive compressor 2 from the front side.

Figure 11:
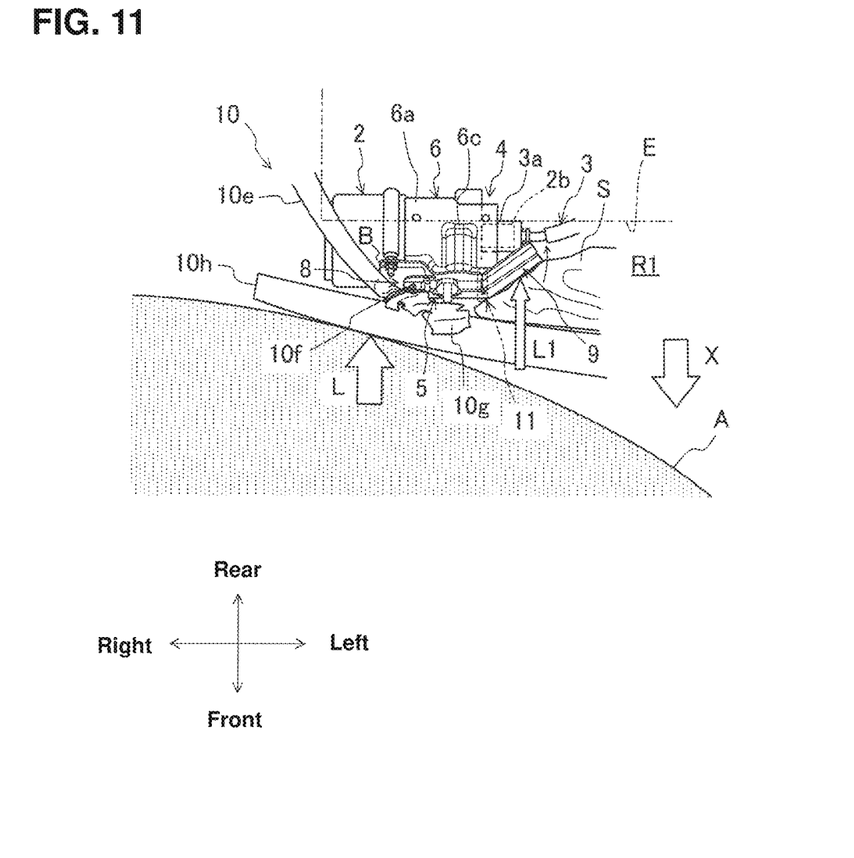
FIG. 11 is a schematic plan view of the front structure of the right side of the vehicle in a state just after the rearward moving of the frame structure and the shroud start end, which happens after the state shown in FIG. 10.

On the other hand, since a specified space is provided on the rear side of the second cover portion 9 of the protecting member 4, as shown in FIGS. 10 and 11, the second cover portion 9 moves rearwardly, being bent with the causing point at the low rigidity portion 11 relative to the first cover portion 8, to the position where the second cover portion 9 covers the area corresponding to the harness connection portion 2b of the electromotive compressor 2.

Thus, according to the embodiment of the present invention, since the protecting member 4 comes to cover the live part 2a and the harness connection portion 2b of the electromotive compressor 2 in a close state when the impact load L is applied to the front structure 10 of the vehicle 1 from the front side, a state where the live part 2a and the harness connection portion 2b are exposed is so prevented that the live part 2a and the harness connection portion 2b can be protected securely.

Meanwhile, since the specified space is formed between the second cover portion 9 and the harness connection portion 2b in a normal state, a worker can easily conduct (perform) attaching or removing of the high-voltage harness 3 for the electromotive compressor 2 in the assembling or maintenance work.

Moreover, the first cutting recess portion 5b and the first long hole 5d can be formed relatively easily at the continuous portion of the first cover portion 8 and the second cover portion 9. Accordingly, forming (processing) costs of the protecting member 4 can be reduced.

Further, since the first long hole 5d at the low rigidity portion 11 is formed at the position to straddle the ridgeline portion 5a extending in the vehicle width direction, in a case where the second cover portion 9 is bent rearwardly relative to the first cover portion 8, the impact load L1 can be efficiently transmitted from the ridgeline portion 5a to the low rigidity portion 11, so that the bending deformation caused by the low rigidity portion 11 can be generated stably. Accordingly, in a case where the impact load L1 is applied to the protecting member 4 from the front side, it can be prevented that the second cover portion 9 is deformed in an unintended direction relative to the first cover portion 8, so that the harness connection portion 2*b* can be securely covered with the second cover portion 9.

Also, the upper side of the area corresponding to the live part 2*a* of the electromotive compressor 2 can be protected with the third cover portion 6*a*, and the lower side of the area corresponding to the live part 2*a* of the electromotive compressor 2 can be protected with the fourth cover portion 7*a*. Accordingly, the electromotive compressor 2 can be securely protected even if the impact load L is applied to the electromotive compressor 2 from the vehicle upper side or the vehicle lower side.

Further, since the third cover portion 6*a* covering the upper side of the electromotive compressor 2 and the fourth cover portion 7*a* covering the lower side of the electromotive compressor 2 are configured to be separate from the first cover portion 8 covering the front side of the electromotive compressor 2, the protecting member 4 which has a complex shape such that it covers the area corresponding to the live part 2*a* of the electromotive compressor 2 from three sides of the front side, the upper side, and the lower side can be relatively easily manufactured. Thus, the processing (manufacturing) steps are so reduced that the processing (manufacturing) costs can be reduced.

Moreover, since the third cover portion 6*a* and the fourth cover portion 7*a* are provided with the first overhang portion 6*c* and the second overhang portion 7*c* which overhang toward the upper side and the lower side and extend in the vehicle longitudinal direction, respectively, the section modulus of each cross section of the third cover portion 6*a* and the fourth cover portion 7*a* which crosses the vehicle longitudinal direction becomes large. Thereby, each deformation, in the vehicle vertical direction, of the third cover portion 6*a* and the fourth cover portion 7*a* relative to the first cover portion 8 becomes so difficult that generation of noises, which may be caused by vertical vibrations of the third cover portion 6*a* or the fourth cover portion 7*a*, or deterioration of the durability performance can be prevented.

Herein, while the move of the second cover portion 9 of the front structure 10 of the vehicle according to the embodiment of the present invention when the shroud S contacts the protecting member 4 from the front side and the impact load L1 is applied to the second cover portion 9 has been described, the second cover portion 9 performs the similar move even when any other component than the shroud S contacts the protecting member 4.

Further, while the harness connection portion 2*b* of the above-described embodiment is provided in the left-side outer peripheral area of the electromotive compressor 2, the front structure 10 of the present invention is applicable even in a case where the harness connection portion 2*b* is provided in the right-side outer peripheral area, the upper-side outer peripheral area, or the lower-side outer peripheral area of the electromotive compressor 2.

Also, while the electromotive compressor 2 is fixed to the front side of the engine E in the above-described embodiment, the present invention is not limited to this. For example, the electromotive component 2 may be fixed to the front side of any frame portion or component positioned in the vehicle front area.

Moreover, while the low rigidity portion 11 of the above-described embodiment is constituted by the first cutting recess portion 5*b*, the second cutting recess portion 5*c*, the first long hole 5*d*, the second long hole 5*e*, and the continuous portions 5*f* which are positioned in a row in the vertical direction, it is unnecessary that these are positioned in a row as long as the second cover portion 9 is bent rearwardly relative to the first cover portion 8 when the impact load L1 is applied. Also, the low rigidity portion 11 may be constituted by the first cutting recess portion 5*b* and the second cutting recess portion 5*c* only or by the first long hole 5*d* and the second long hole 5*e* only. Additionally, the first long hole 5*d* and the second long hole 5*e* may have any other shape, such as a circular shape or a polygonal shape. In particular, in order to set the rigidity of the continuous portion of the first cover portion 8*a* and the second cover portion 9 to be lower than that of the first cover portion 8 and the second cover portion 9, the thickness of the above-described continuous portion may be set to be smaller (thinner) that of the first and second cover portions 8, 9 without forming the above-described cutting recess portion or long hole.

Further, while the first long hole 5*d* of the above-described embodiment is provided to straddle the ridgeline portion 5*a*, the first cutting recess portion 5*b*, the second cutting recess portion 5*c*, and the second long hole 5*e* may be provided to straddle the ridgeline portion 5*a*.

Also, the third cover portion 6*a* and the fourth cover portion 7*a* are configured to be separate from the first cover portion 8 in the above-described embodiment, these portions 6*a*, 7*a* may be formed integrally with the first cover portion 8.

Moreover, while the first overhang portion 6*c* of the third cover portion 6*a* is configured to overhang upwardly in the above-described embodiment, it may overhang downwardly. Additionally, while the second overhang portion 7*c* of the fourth cover portion 7*a* is configured to overhang downwardly, it may overhang upwardly. Further, it is unnecessary that both of the first overhang portion 6*c* of the third cover portion 6*a* and the second overhang portion 7*c* of the fourth cover portion 7*a* are provided, but either one of these can be provided.

Additionally, while the protecting member 4 of the above-described embodiment protects the electromotive compressor 2, the present invention is applicable to a case where any other high-voltage component, such as an electromotive water pump or electromotive oil pump, is protected by this protecting member 4.

The present invention is useful for the front structure of the vehicle in which the high-voltage component, such as the electromotive compressor, is provided.

What is claimed is:

1. A front structure of a vehicle, comprising:
    a high-voltage component including a live part to be energized when being operated, the high-voltage component being fixed to a front side of a fixed portion provided in a vehicle front area; and
    a protecting member to protect the high-voltage component,
    wherein a harness connection portion where a high-voltage harness is connected is provided in an outer peripheral area of at least one of both sides, in a vehicle width direction, an upper side, and a lower side of said high-voltage component, and
    said protecting member comprises a first cover portion which covers an area corresponding to said live part from the front side, a second cover portion which is provided continuously to said first cover portion and covers said harness connection portion from the front side with a specified distance from the harness connection portion, and a low rigidity portion which is provided at a continuous portion of said first cover portion and said second cover portion and has lower rigidity than the first cover portion and the second cover portion.

2. The front structure of the vehicle of claim 1, wherein said low rigidity portion is constituted by one or more cutting recess portions or hole portions and one or more continuous portions connecting said first cover portion and said second cover portion.

3. The front structure of the vehicle of claim 2, wherein said harness connection portion is provided in the outer peripheral area of either one of the both sides, in the vehicle width direction, of said high-voltage component, said protecting member has a ridgeline portion extending in the vehicle width direction, and at least one of said cutting recess portion and said hole portion is formed at a position to straddle said ridgeline portion.

4. The front structure of the vehicle of claim 1, wherein said harness connection portion is provided in the outer peripheral area of either one of the both sides, in the vehicle width direction, of said high-voltage component, and said protecting member comprises a third cover portion which extends rearwardly from an upper portion of said first cover portion and covers the area corresponding to said live part from the upper side and a fourth cover portion which extends rearwardly from a lower portion of said first cover portion and covers the area corresponding to said live part from the lower side.

5. The front structure of the vehicle of claim 4, wherein said third cover portion and said fourth cover portion are configured to be separate from said first cover portion.

6. The front structure of the vehicle of claim 4, wherein at least one of said third cover portion and said fourth cover portion is provided with an overhang portion which overhangs toward the upper side or the lower side and extends in a vehicle longitudinal direction.

7. A front structure of a vehicle, comprising:
a high-voltage component including a live part to be energized when being operated, the high-voltage component being fixed to a front side of a fixed portion provided in a vehicle front area; and
a protecting member to protect the high-voltage component,
wherein a harness connection portion where a high-voltage harness is connected is provided in an outer peripheral area of at least one of both sides, in a vehicle width direction, an upper side, and a lower side of said high-voltage component, and said protecting member comprises a first cover portion which covers an area corresponding to said live part from the front side, a second cover portion which is provided continuously to said first cover portion and covers said harness connection portion from the front side with a specified distance from the harness connection portion, and a low rigidity portion which is provided at a continuous portion of said first cover portion and said second cover portion and configured to become a causing point to bend said second cover portion rearwardly relative to said first cover portion such that the second cover portion moves to a position to cover said harness connection portion in a case where an impact load is applied to the second cover portion from a vehicle front side.

8. The front structure of the vehicle of claim 7, wherein said low rigidity portion is constituted by one or more cutting recess portions or hole portions and one or more continuous portions connecting said first cover portion and said second cover portion.

9. The front structure of the vehicle of claim 8, wherein said harness connection portion is provided in the outer peripheral area of either one of the both sides, in the vehicle width direction, of said high-voltage component, said protecting member has a ridgeline portion extending in the vehicle width direction, and at least one of said cutting recess portion and said hole portion is formed at a position to straddle said ridgeline portion.

10. The front structure of the vehicle of claim 7, wherein said harness connection portion is provided in the outer peripheral area of either one of the both sides, in the vehicle width direction, of said high-voltage component, and said protecting member comprises a third cover portion which extends rearwardly from an upper portion of said first cover portion and covers the area corresponding to said live part from the upper side and a fourth cover portion which extends rearwardly from a lower portion of said first cover portion and covers the area corresponding to said live part from the lower side.

11. The front structure of the vehicle of claim 10, wherein said third cover portion and said fourth cover portion are configured to be separate from said first cover portion.

12. The front structure of the vehicle of claim 10, wherein at least one of said third cover portion and said fourth cover portion is provided with an overhang portion which overhangs toward the upper side or the lower side and extends in a vehicle longitudinal direction.

* * * * *